United States Patent

[11] 3,603,066

| [72] | Inventors | Donald E. Burrough;<br>Joe Paul Leinhauser, both of Ottumwa, Iowa |
|---|---|---|
| [21] | Appl. No. | 9,851 |
| [22] | Filed | Feb. 9, 1970 |
| [45] | Patented | Sept. 7, 1971 |
| [73] | Assignee | Deere & Company<br>Moline, Ill. |

[54] HEADER CONTROL FOR A HARVESTER
5 Claims, 1 Drawing Fig.

[52] U.S. Cl. ................................................ 56/208
[51] Int. Cl. ........................................... A01d 67/00
[50] Field of Search ........................................ 56/208, 10.9, 209, 212

[56] References Cited
UNITED STATES PATENTS

| 2,750,204 | 6/1956 | Ohrmann | 56/209 X |
| 2,766,572 | 10/1956 | Vogelaar | 56/10.9 X |
| 3,485,020 | 12/1969 | Soteropulos | 56/212 |

*Primary Examiner*—Louis G. Mancene
*Assistant Examiner*—D. L. Weinhold
*Attorneys*—H. Vincent Harsha, Harold M. Knoth, William A. Murray and John M. Nolan ABSTRACT: A self-propelled windrower has a forwardly disposed transversely elongated header mounted on the main frame of the windrower for independent vertical adjustment of the opposite ends of the header. The position of the opposite ends of the header are respectively controlled by a pair of hydraulic cylinders operative between the main frame and the header at transversely spaced points, one of said cylinders being a master cylinder and the other being a slave cylinder. Both cylinders are simultaneously actuated through a first control valve, which controls the fluid pressure supplied to the master cylinder, so that the opposite ends of the header move in unison, while the header is tilted by actuating a second control valve, which adds or subtracts fluid from the slave cylinder only to raise or lower one side of the header relative to the other.

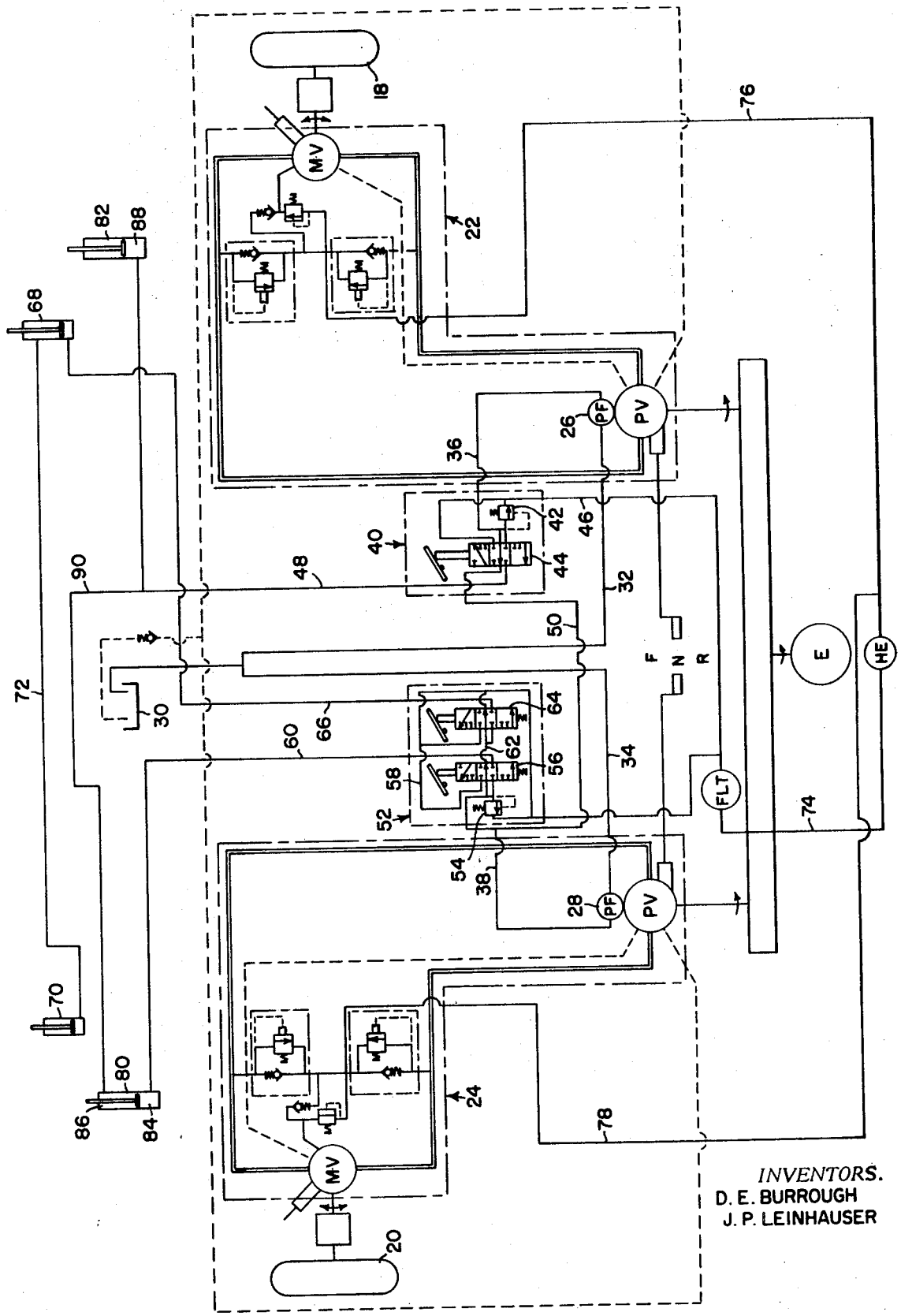

3,603,066

HEADER CONTROL FOR A HARVESTER

BACKGROUND OF THE INVENTION

This invention relates to an improved means for controlling the position of a header on a windrower or the like, wherein the header is mounted for vertical adjustment of the opposite ends of the header independently or in unison.

Such a header is shown in U.S. Pat. Nos. 3,474,607 and 3,485,020, both of which are assigned to the assignee herein. Both of said patents disclose a self-propelled windrower having a forward, transversely elongated, harvesting header mounted for vertical adjustment on the main frame or traction unit on a pair of transversely spaced parallelogram-type linkages, which permit vertical adjustment of the opposite ends of the header independently or in unison, the position of the opposite ends of the header being respectively established by a pair of hydraulic cylinders respectively associated with the respective linkages. However, in both of said patents, the two hydraulic cylinders are separately controlled, independent control valves. Thus, when the operator desires to raise or lower both ends of the header in unison, he must simultaneously actuate both control valves.

In normal operation, the entire header is generally raised or lowered, and it is desirable that both ends of the header move at the same rate and at the same time, so that the header is maintained in a level condition. In most operations, it is relatively infrequent that the header is tilted by raising or lowering only one end of the header, although such independent adjustment is a desirable feature. The disadvantage of requiring the actuation of two separate valves for normal, level, vertical adjustment of the header was to some extent overcome by the mechanism for actuating the valves shown in U.S. Pat. No. 3,485,020. However, such a mechanism is relatively expensive, and there is still the possibility of moving the opposite ends of the header at different rates due to different flow characteristics in the separate valves or backlash in the mechanism for operating the valves.

SUMMARY OF THE INVENTION

According to the present invention, an improved control system is provided for selectively adjusting the opposite ends of the header independently or in unison.

More specifically, a control system is provided wherein only a single valve is actuated to vertically adjust the entire header, a second valve being provided to independently adjust one end of the header relative to the other and thereby tilt the header.

An important feature of the invention resides in the use of a master and a slave cylinder to respectively control the opposite ends of the header, so that the entire header can be vertically adjusted by controlling the flow of fluid pressure to and from the master cylinder only, the tilt of the header being controlled by actuating a second valve which supplies fluid to or subtracts fluid from the trapped fluid between the master and slave cylinders.

Another feature of the invention resides in the incorporation of the header control system into the hydrostatic drive system for the windrower.

BRIEF DESCRIPTION OF THE DRAWING

The sole Figure is a schematic illustration of the windrower drive system and the control system for controlling the position of the header.

DESCRIPTION OF THE PREFERRED EMBODIMENT

The harvesting machine chosen to illustrate the invention is a self-propelled windrower, which is described in said U.S. Pat. Nos. 3,474,607 and 3,485,020. The drive system for said windrower is described in greater detail in U.S. Pat. No. 3,469,381, which is also assigned to the assignee herein. As described in said patent, the windrower has right and left drive wheels 18 and 20, which are respectively driven by right and left hydrostatic units, indicated in their entirety by the numerals 22 and 24 respectively. The hydrostatic units are identical and respectively include variable displacement hydraulic pumps and variable displacement hydraulic motors, the windrower being steered and its travel speed being controlled by adjustment of the ratio in the respective hydrostatic drives. The right and left hydrostatic units respectively include fixed displacement charge pumps 26 and 28, which are respectively connected to the system reservoir 30 by intake lines 32 and 34 and have outlet lines 36 and 38. The outline line 36 of the right charge pump is connected to the inlet of a right control valve package 40 having a relief valve 42 and a manually actuated three-position, open-center, spool-type valve 44, which is schematically illustrated in the drawing. The control valve 44 is connected to the charge pump outlet line 36, to a return line 46, to a working outlet line 48, and to a second outlet line 50, which is connected to the left charge pump outlet line 38, so that when the valve 44 is in the neutral condition, as illustrated, the output of the right charge pump 26 is connected to the output of the left charge pump 28.

The output line 38 of the left charge pump together with the line 50 serve as the input to the left control valve package 52, which also has a relief valve 54 at its inlet. The left control valve package 52 includes a first open-center three-position, spool-type control valve 56 connected to the pump outlet line 38, a return line 58, a working outlet line 60, and a second outlet line 62, which serves as the input to a reel lift control valve 64. The valve 64 is a three-position, open-center-type valve and has an outlet line 66. In its neutral condition, as shown, the control valve 64 connects the line 62 to the return line 58, while in its "raise" position, it connects the line 62 to the outlet line 66, which is connected to one end of a master cylinder 68, the other end of which is connected to a slave cylinder 70 via a line 72. As described in said U. S. Pat. No. 3,469,381, the cylinders 68 and 70 establish the vertical position of the opposite ends of a harvesting reel on the header, so that actuation of the valve 64 to pressurize the line 66 raises both ends of the reel, while actuation of the valve 64 in the opposite direction connects the line 66 to the return line 58 to lower the reel.

In operation, when the valves are in their neutral position, as illustrated, the entire output of the two charge pumps 26 and 28 is directed through the valves 56 and 64 and to the return line 58, from where it flows through the filter and the heat exchanger via a hydraulic line 74. At the outlet of the heat exchanger, the line 74 branches into lines 76 and 78, which respectively provide the fluid to charge the right and left hydrostatic units 22 and 24, the check and relief valves in the charge circuit within the hydrostatic units functioning substantially as described in said U.S. Pat. No. 3,469,381. The fluid not utilized to charge the circuits is dumped into a drain line, which is shown in dotted lines on the drawing, the drain line circulating through the pumps and motors in the respective hydrostatic units to cool the units.

As described in said U.S. Pat. No. 3,474,607 and 3,485,020, the windrower has a forward, transversely elongated header mounted on the traction unit for independent vertical adjustment of either end of the header, the opposite ends of the header being controlled by separate hydraulic cylinders, which operate between the traction unit and the header at transversely spaced points, the hydraulic cylinders being schematically illustrated herein and indicated generally by the numerals 80 and 82. As described in said patents, extension of the cylinders raises the respective end of the header with which they are associated. The left hydraulic cylinder 80 is a two-way cylinder having an inlet end 84 and an outlet end 86, while the right-hand cylinder 82 is a one-way cylinder having an inlet end 88 connected to the outlet end 86 of the cylinder 80 in a master-slave relationship by a hydraulic line 90. The left-hand cylinder 80 is preferably larger than the cylinder 82 so that the effective cross-sectional area of the outlet or piston end 86 equals the effective area of the inlet end 88 of the cylinder 82, so that the cylinder pistons will move at the same speed.

In operation, to raise the entire header, the valve 56 is shifted to its "raise" position (upwardly in the drawing) connecting the fluid pressure source to the line 60, which causes extension of both cylinders 80 and 82 at the same rate. Since the valve 44 is in its neutral condition, as shown, the output from the charge pump 26 is added to the output of the charge pump 28, so that the output of both pumps is directed to the master cylinder 80, providing a relatively rapid rate of movement of the header. As is apparent, in the neutral position of the valve 56, the line 60 is blocked to hold the header in the desired position. The header is lowered by shifting the valve 56 to its "lower" position (downwardly in the drawing), connecting the line 60 to the return line 58.

If it is desired to tilt the header, the valve 44 is actuated. As is apparent, shifting the valve upwardly connects the outlet line 48 to the output line of the charge pump 26, adding fluid in the line 90 between the cylinders 80 and 82. Since the cylinder 80 is locked, the cylinder 82 extends, raising the right side of the header relative to the left. Conversely, the right side of the header can be dropped relative to the left by shifting the valve downwardly to connect the line 48 to the return line 46, subtracting fluid from the trapped oil between the cylinder 82.

We claim:

1. In a self-propelled agricultural machine having a mobile main frame, a forward, transversely elongated agricultural tool having first and second opposite end portions and means mounting the tool on the frame for generally vertical adjustment of the opposite end portions of the tool on the frame separately or in unison, the improvement comprising: a source of fluid pressure on the main frame; a master and a slave hydraulic cylinder respectively operative between the agricultural tool and the frame at transversely spaced points for respectively vertically adjusting the first and second opposite end portions of the tool, said master hydraulic cylinder having inlet and outlet ends and said slave cylinder having an inlet end; hydraulic conduit means connecting the outlet end of the master hydraulic cylinder to the inlet end of the slave hydraulic cylinder; a first control valve means operatively connected to the source of fluid pressure and to the inlet end of the master hydraulic cylinder and selectively actuatable to supply fluid pressure thereto or exhaust fluid pressure therefrom to respectively raise and lower the first and second opposite end portions of the tool in unison; and a second control valve means operatively connected to a source of fluid pressure and to the inlet end of the slave hydraulic cylinder and selectively actuatable to supply fluid pressure thereto or exhaust fluid pressure therefrom to respectively raise or lower the second end portion of the tool independently of and relative to the first end portion.

2. The invention defined in claim 1 wherein the agricultural machine is a harvesting machine and the tool comprises a transversely elongated harvesting header.

3. The invention defined in claim 2 wherein the effective cross section of the outlet end of the master hydraulic cylinder equals the effective cross section of the inlet end of the slave hydraulic cylinder so that the first and second end portions of the header raise and lower at the same rate when the first control valve means is actuated.

4. The invention defined in claim 3 wherein the harvesting machine comprises a windrower having a hydrostatic drive means, and the fluid pressure source comprises a charge pump means in said hydrostatic drive means.

5. The invention defined in claim 4 wherein the hydrostatic drive means includes first and second hydrostatic drive units, and the charge pump means comprises first and second charge pumps respectively disposed in the first and second hydrostatic drive units, the first and second control valve means being respectively connected to the first and the second charge pumps.